United States Patent [19]

Selker

[11] Patent Number: 5,777,704
[45] Date of Patent: Jul. 7, 1998

[54] BACKLIGHTING AN LCD-BASED NOTEBOOK COMPUTER UNDER VARYING AMBIENT LIGHT CONDITIONS

[75] Inventor: Edwin Joseph Selker, Palo Alto, Calif.

[73] Assignee: International Business Machines Corporation, Armonk, N.Y.

[21] Appl. No.: 741,488

[22] Filed: Oct. 30, 1996

[51] Int. Cl.$^6$ .................. G02F 1/1333; G02F 1/13; H05K 5/00
[52] U.S. Cl. .................. 349/58; 349/1; 361/680; 361/681
[58] Field of Search .................. 349/1, 6, 58, 68; 361/680, 681, 683

[56] References Cited

U.S. PATENT DOCUMENTS

| 4,403,216 | 9/1983 | Yokoi | 340/705 |
|---|---|---|---|
| 5,216,411 | 6/1993 | Ashitomi et al. | 349/1 |
| 5,276,589 | 1/1994 | Bartlett et al. | 361/681 |
| 5,489,924 | 2/1996 | Shima et al. | 345/173 |
| 5,696,529 | 12/1997 | Evanicky et al. | 349/6 |
| 5,717,566 | 2/1998 | Tao | 361/681 |

FOREIGN PATENT DOCUMENTS

| 2582839 | of 1987 | France . |
|---|---|---|
| 63-018328 | 1/1988 | Japan . |

Primary Examiner—Anita Pellman Gross
Attorney, Agent, or Firm—James C. Pintner; R. Bruce Brodie

[57] ABSTRACT

An arrangement for enhancing the observability of a multicolored liquid crystal display in a computer of the notebook type using an arrangement in which the top lid of the laptop is mechanically separated into a diffuser/reflective surface and the LCD in its frame, the diffusing/reflecting lid is attached through a slider and linkage arrangement permitting the diffuser/reflector to act as a flat field illuminator and to move in a plane, apart from, yet forming a dihedral angle with the plane of the LCD. The lid so positioned can opportunistically reflect ambient light through the plane of the LCD. Also, by causing the lid to project over the plane of the LCD, it secures a contrast-maintaining shadow otherwise bleached by light incident to the LCD viewing surface.

9 Claims, 4 Drawing Sheets

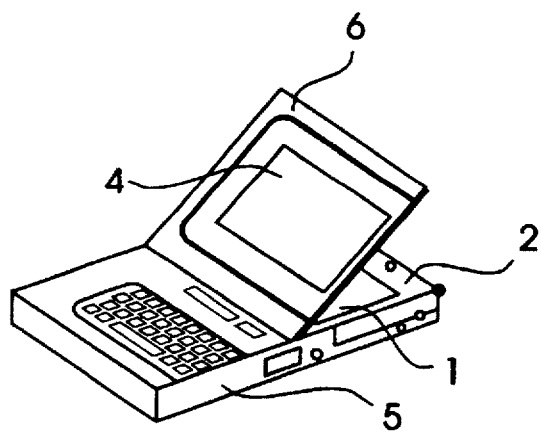
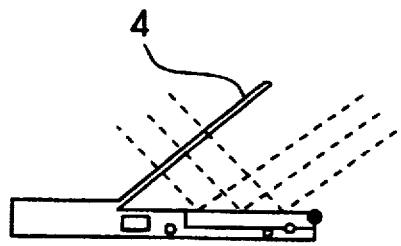
FIG. 1(a)
FIG. 1(b)
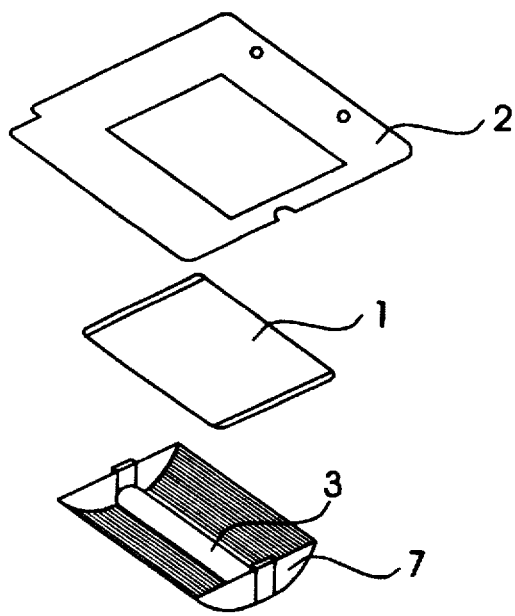
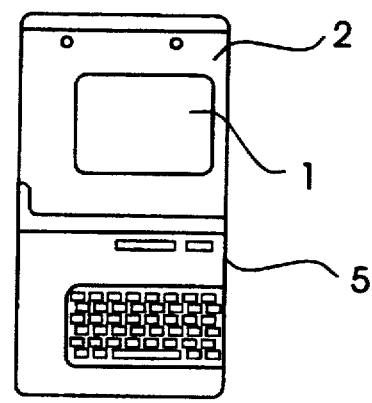
FIG. 1(c)
FIG. 1(d)
FIG. 1
(PRIOR ART)

BACKLIGHTING AN LCD-BASED NOTEBOOK COMPUTER UNDER VARYING AMBIENT LIGHT CONDITIONS

FIELD OF THE INVENTION

This invention relates to the backlighting of multicolored liquid crystal displays under varying ambient lighting conditions, and more particularly to methods and means for backlighting such displays when used as an element in laptop computers.

DESCRIPTION OF RELATED ART

Liquid Crystals and Liquid Crystal Displays

It is known that in a liquid crystal (LC), particles, atoms or molecules tend to arrange themselves with a degree of order far exceeding that of ordinary liquids and approaching that of solid crystals. As a result, liquid crystals have many of the optical properties of solid crystals. Moreover, because its atomic or molecular order is not as firmly fixed as that of a solid crystal, a liquid can be easily modified by electromagnetic radiation, mechanical stress, or temperature with corresponding changes in its optical properties. Restated wryly, an LC is a collection of cigar-shaped organic molecules that exhibit an orientation order under appropriate pressure, temperature, and electro-optical field conditions.

A liquid crystal display (LCD) is an information display comprising a picture element (pixel) addressable array. This pixel-addressable array is formed from a thin layered sandwich of glass plates, polarizing filters, transparent electrodes, and liquid crystal material. The variety of electro-optical effects associated with LCs permit LCDs to be fashioned into different types of information displays. Because of the LCD's thin sandwich construction, the bulk associated with electron beam tube displays can be eliminated. Furthermore, many LCDs are reflective, meaning they use only ambient light to illuminate the display. Even where LCDs do require an external light source, they consume much less power than electron beam devices.

Passive And Active Matrix LCDs

LCDs are fashioned either as passive or active matrix devices. A passive matrix display is addressed by a set of multiplexed transparent electrodes, perpendicular to one another, above and below the LC layer in a row and column formation. A passive pixel is addressed when there is a sufficient voltage gradient across it to cause the LC molecules to align themselves parallel to the electric field.

In an active matrix display, addressing takes place completely behind the LC film. The front surface of the LCD is coated with a continuous electrode, while the rear surface is patterned as a pixel-addressable array. An array of thin film transistors (TFTs) operates to address corresponding pixels (LC cells) individually. That is, each TFT of a pixel is addressed by a set of narrow multiplexed electrodes running along the gaps between pixels. In turn, a pixel is addressed by applying current to a gate line which switches the TFT on and allows charge to go from the source line onto the rear electrode. This sets up a voltage across a pixel, turning it on.

An active matrix LCD does not suffer the limitations of a passive display. That is, it can be viewed at an angle of up to 45 degrees and has a contrast of 40 to 1. Disadvantageously, it requires more intense backlighting because neither the TFTs nor the gate or source lines are transparent and therefore block a fraction of the illuminating light.

Laptops, LCDs, and Display Lighting

A laptop is defined as a microcomputer small enough to use on one's lap. Laptops are also referenced as "notebook" computers. The latter stems from the fact that they may be closed and carried much like a closed book when not in use. Also, they may be opened up, as is a book, when being read. When so open, the display occupies the top lid or cover portion and is approximately vertical and hinged to the bottom lid or cover portion. Relatedly, the latter contains information entry and processing facilities, and is electrically and logically coupled to the LCD. Laptops may be plugged into an electrical outlet or more conveniently powered by internal battery for several hours.

Ambient light reflectively illuminates the opened display. However, the display is primarily sensed by emanations through an LCD of the active matrix, light-transmissive, multicolored type. Now, when the top lid is open, intense ambient light incident on the display may bleach out all or some of the presentation. This requires either that the cover position or the entire laptop be repositioned. Even the dynamic range of any backlighting may not be sufficient to overcome the intensity of the ambient light.

In this invention, attention is directed to the "transmissive" rather than the "reflective" or "transflective" LCDs. It is well appreciated that the color range, contrast ratio, viewing angles, etc. of transmissive active matrix LCDs far exceed the other types. All three types of LCDs include one or more polarizing layers in their layered sandwich which has a dimming effect on both reflected light and backlighting. The price paid in the case of active matrix LCDs is the backlighting requirement and the local battery drain when driving the laptop.

Backlighting and the Veglia, Yokoi, and Matsushita References

There are many backlighting arrangements. For example, it is well known to use a fluorescent light source for backlighting. Such a source is "light piped" onto a diffusing (defocusing lens) surface behind the LCD as a flat field illuminator thereof. Both the light source and the diffuser were invariantly positioned in fixed relation to each other.

It is broadly known from Veglia, FR 2,582,839 to backlight an LCD panel for use in a road vehicle, ship, or aircraft by way of a half-silvered mirror or equivalent forming a dihedral angle with the panel. The angle is acute enough such that ambient light incident on the mirror back is transmitted through the mirror to the LCD panel. Alternatively, if such light is insufficient, an artificial source reflects light over the opposite mirror surface, causing the light to be transmitted through the LCD panel.

Yokoi, U.S. Pat. No. 4,403,216, "Display", issued Sep. 6, 1983, discloses in FIGS. 2–4 an LCD flat panel display and a plane mirror forming an acute angle of opposing surfaces such that ambient light transmitted through the LCD may be viewed reflectively from the mirror (FIG. 3), or such light reflected from the mirror may be viewed transmissively through the LCD (FIG. 4).

Japanese Patent 63-18328, "External Light Reflecting Device for a Liquid Crystal TV Receiver", issued Jan. 26, 1988, to Matsushita Electric Co., discloses a tipped-up LCD panel movable in an angular relation with an opposing reflective surface in a first position, the LCD panel being illuminated through a back panel diffusion light source. When the LCD panel is raised to a second position, the diffusion source is turned off, and light incident to the back panel is reflectively transmitted through the LCD panel. The back panel can be formed from a half-silvered mirror. Significantly, the LCD panel is hinged approximately midway along the longitudinal extent of the notebook/TV, and is not hinged at the edges as are notebook or laptop computers.

SUMMARY OF THE INVENTION

It is accordingly an object of this invention to devise a unitary mechanical structure to enable the LCD portion of a laptop computer to be viewed in a broad range of ambient light and shadow conditions.

It is yet another object of this invention that the mechanical structure exhibit ease of use in varying environments, such as cramped airline passenger seating, outdoors, and in use with light projectors and the like.

It is still another object to devise a structure for reducing the laptop power consumption by increasing the reliance on ambient light for backlighting rather than that of a current driven lightpipe diffuser, and avoidance of a bleached or washed out LCD presentation.

These objects are satisfied in an arrangement in which the top lid of a laptop computer is mechanically bifurcated into a lightpipe diffuser/reflective outer portion and a transmissive multicolored LCD inner portion, and in which the outer portion is attached through appropriate folding links and hinges to the LCD. As a consequence, the outer portion can be positioned in any one of a range of planes opposing the LCD. The outer portion forms a dihedral angle only with the LCD and not necessarily with any other plane or surface associated with the laptop.

In this invention, the outer portion, when in close contact with the LCD, provides diffused artificial backlighting. However, when the outer portion is spatially positioned relative to the LCD by the laptop user, opportunistically it causes ambient light sources to be reflectively captured and transmitted through the display. This enhances the display while allowing the diffused light source to be reduced in intensity and allowing a reduction in laptop battery drain. A related advantage is that when the outer portion was closed upon the LCD, a footprint no larger than that of the laptop results.

As the outer portion is rotated and translated to a position projecting over the LCD, it forms a shroud as well as calibrates the angle at which the display is mounted above the projection surface. The shroud shadow permits the contrast to be preserved in the LCD image and avoids display image bleaching or washing out. It also provides an unobstructed path through the LCD for an independent source of focused light, such as that furnished by an overhead projector. Lastly, a rotated and translated outer portion additionally provides a counterweight balance to both the LCD and the laptop.

BRIEF DESCRIPTION OF THE DRAWING

FIG. 1a–1d shows backlighting for a liquid crystal display using a reflecting plate surrounding a diffusion plate according to the prior art.

DESCRIPTION OF THE PREFERRED EMBODIMENT

Figure 2:
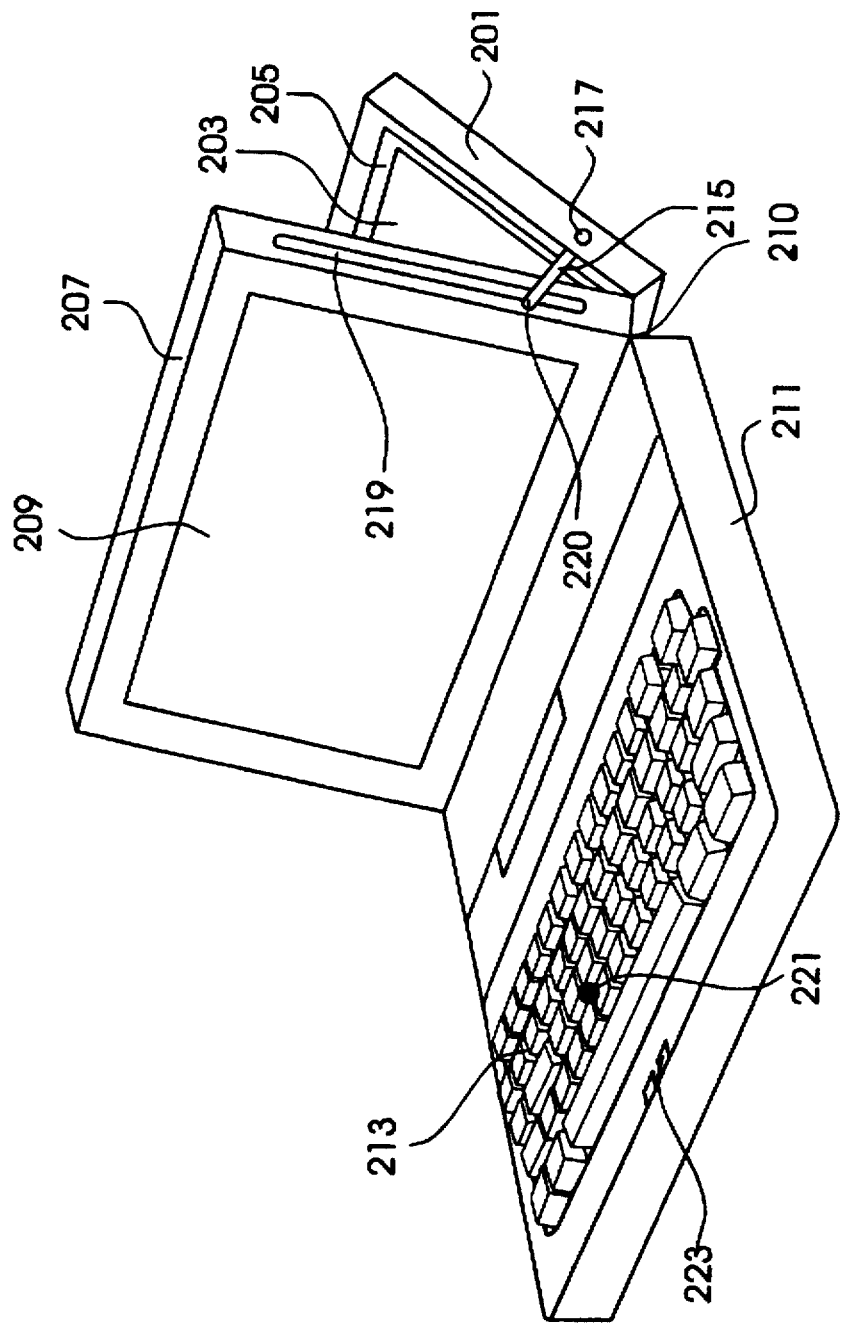
FIG. 2 depicts an IBM Thinkpad 755 laptop computer modified according to the invention emphasizing the bifurcated cover to the laptop and the link and hinged attachment between the lightpipe backlight diffuser/reflector and the LCD.

Referring now to FIG. 1, there are shown four figures emphasizing the aspects of a prior art arrangement for backlighting a liquid crystal display using a reflecting plate surrounding a diffusion plate. In FIG. 1A, LCD 4 is set in a frame member 6, which frame member is hingedly attached to a main electronic housing 5. When the LCD is in a closed position with the housing 5, it lies coextensive over a diffusion plate 1 surrounded by a reflecting plate 2. An exploded view of the reflecting plate, diffusion plate, and artificial source of illumination 3, 7 is shown in FIG. 1C.

FIG. 1D illustrates the coextension among the body 5, the diffusion plate 1, and reflecting plate 2.

When the panel 6 is raised from the main body 5, the light source 3 is turned off and the backlighting of the LCD is supported by ambient light reflected by the surface 2. This is clearly depicted in FIG. 1D.

Referring now to FIG. 2, there is shown an IBM Thinkpad 755 laptop computer modified according to the invention. The laptop is of a notebook type. This means that it conveniently folds closed when not in use, and folds open for operating purposes. It comprises a planar, light-transmissive, multicolored liquid crystal display 209 set within a frame 207 rotationally coupling a base housing 211 at a coupling hinge 210 (not shown in detail).

The base 211 includes information entry and processing facilities such as a keyboard 213, a trackball pointer 221, and trackball controls 223. Typically, the base includes all of the software and hardware elements for storing and executing software applications, in addition to the operating system drivers for maintaining and modifying the display 209. Parenthetically, since the invention relates to the mechanical and optical enhancement of the backlighting of a liquid crystal display, no additional description of the electrical and logical operation of the laptop computer is believed pertinent.

Referring again to FIG. 2, there is shown a bifurcated top formed from a cover 201 link and hingedly attached to the LCD frame 207. More particularly, the backlid or cover 201 is of a size sufficient to cover the entire back portion of the LCD 209. Significantly, the entire side of the lid forms a reflective surface 203, and includes an artificial light source and diffuser 205 in the form of a lightpipe edge mounted around the reflective surface 203. Relatedly, lid 201 is mechanically coupled to the LCD frame 207 by way of a linkage 215 and a pair of hinges 217, 220. Hinge 217 in lid 201 forms a rotational coupling with linkage element 215. However, linkage 215 is both rotatably and translationally attached to the LCD frame 207 by way of hinge 220 traversing a slider 219 within the frame 207. It should be appreciated that a counterpart hinge, linkage, and slider arrangement would preferably also be provided (although not shown in the figure) on the far end of the lid and LCD frame.

The invention contemplates that the laptop is in an operating configuration. This means that the LCD is positioned at a viewing angle with respect to a keyboard user. Nominally, this assumes an angle of 90 degrees or more between the plane of the LCD 209 and the keyboard base 213. Lid 201 can assume one of two positions; namely, a closed or open position. In the closed position, lid 201 contact covers the back side of LCD 209 and backlights LCD 209 exclusively by way of a diffusion source, such as lightpipe 205.

When the lid 201 is separated from the LCD frame 207, it can be positioned in a plane, apart from, yet forming a dihedral angle with the plane of LCD 209. This means that linkage 215 may be a compound linkage and of a length sufficient to allow lid 201 at least a 90° rotation when hinge 220 is at the bottom of slider 219, and a full 180° rotation when the hinge 220 is at the top of the slider 219. This latter attribute permits lid 201 to project over LCD frame 207, thereby casting a desirable shadow when reflective ambient light would otherwise bleach the LCD presentation.

Figure 3:
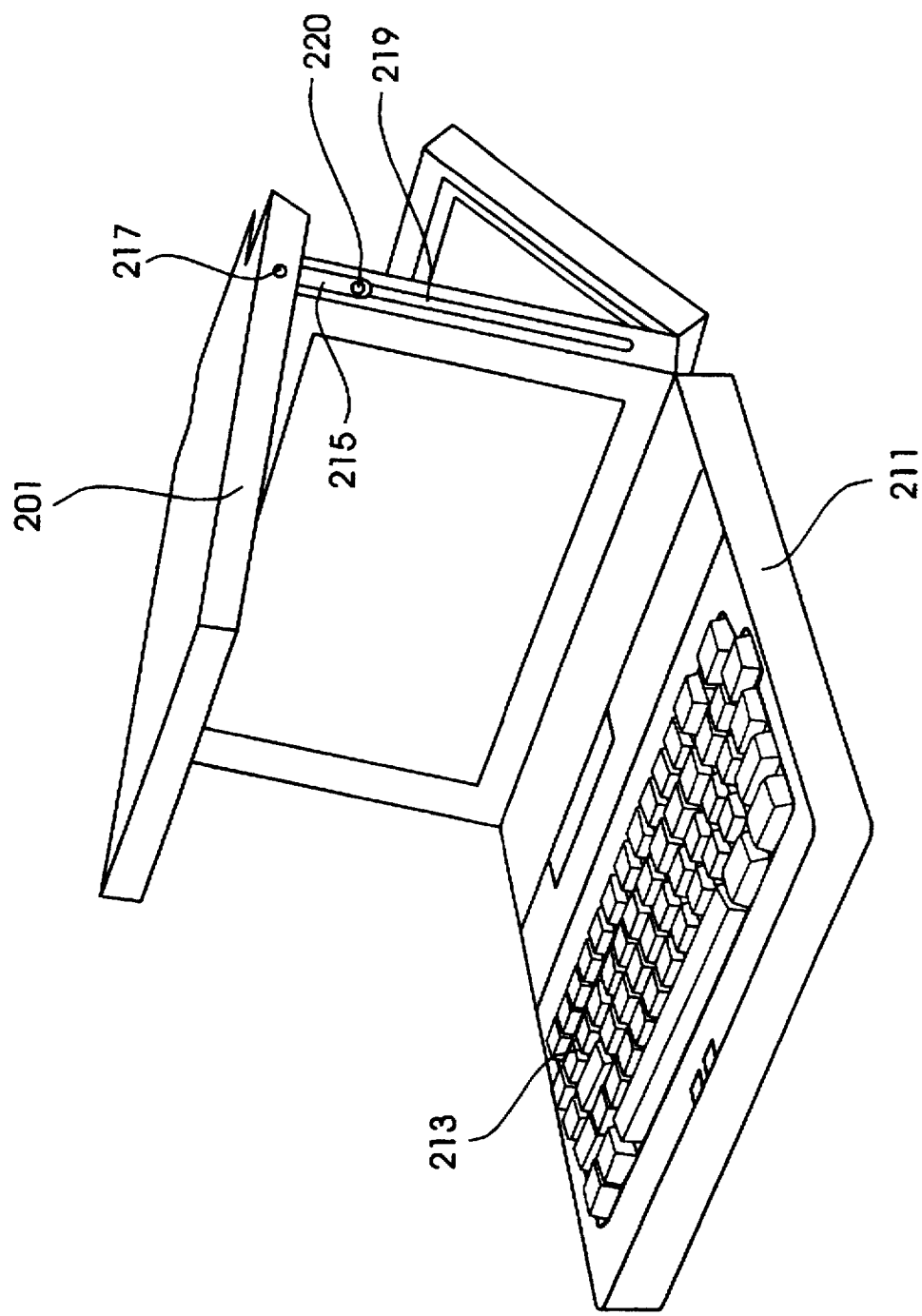
FIG. 3 illustrates the shroud created when the cover is projected over the LCD.

Referring now to FIG. 3, there is shown lid 201 in its fully extended position for purposes of creating a shroud. Clearly, the shadow projection can be altered to suit the convenience of the laptop user. Thus, for outdoor use of a laptop, the shroud provides an additional measure to diminish the bleaching effect of ambient light reflecting off the front of the LCD.

Figure 4:
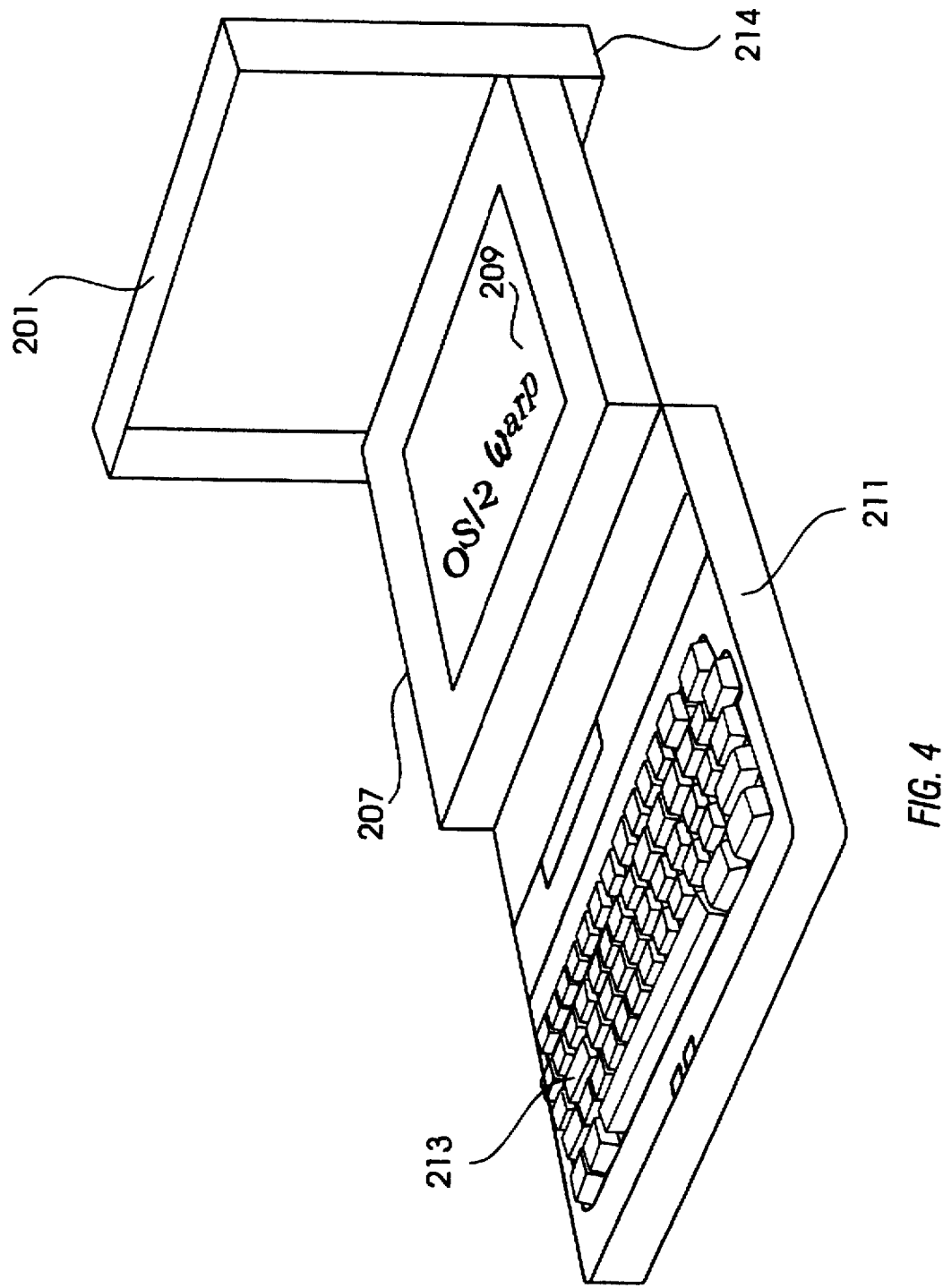
FIG. 4 sets out the alternate advantage of the cover at 90 degrees to the LCD, permitting an independent illumination of the LCD such as by an overhead projector.

Referring now to FIG. 4, there is set out an alternate advantage of the cover at 90 degrees to the LCD plane insofar as the LCD may be independently illuminated by an overhead projector or the like. The bottom portion 214 of lid 201 extends to the surface underneath the laptop and provides support for an air gap between and LCD and a source of illumination underneath (not shown).

These and other extensions of the invention may be made without departing from the spirit and scope thereof as recited in the appended claims.

What is claimed is:

1. In a computer of the notebook type comprising a planar, light-transmissive, multicolored liquid crystal display (LCD) rotationally coupling a base, and information entry and processing means residing in said base for electrically and logically operating said LCD, the combination comprising:

first means for forming a mechanically separable outer protective cover for the LCD, said first means including means for providing diffused artificial backlighting of the LCD when said first means are mechanically engaged as the LCD cover;

second means for positioning the first means in a plane, apart from, yet forming a dihedral angle with the plane of the LCD and for opportunistically reflecting ambient light and projecting the reflected light through the LCD; and third means for positioning the first means so as to project at least a portion of the first means beyond said LCD for providing either an ambient light shroud to the LCD or an unobstructed light path through the LCD.

2. The combination according to claim 1, wherein said second means positions said first means in a plane lying in a range of planes whose longitudinal axis is parallel with the longitudinal axis of the LCD.

3. The combination according to claim 1, wherein said second means includes a pair of linkages hingedly affixing corresponding edges of the first means and the LCD.

4. The combination according to claim 3, wherein said pair of linkages each includes a first and second link hingedly coupling members.

5. The combination according to claim 1, wherein the third means for positioning the first means so as to project at least a portion of the first means beyond said LCD forms a dihedral angle of approximately 90 degrees between said first means and the plane of the LCD.

6. An arrangement for enhancing observability over varying ambient light conditions of a planar, light-transmissive, multicolored liquid crystal display (LCD) rotationally coupled to a base, said LCD having a having a viewing plane and a plane susceptible to backlighting and being electrically and logically operable by circuitry resident in the base, the arrangement comprises:

a separable lid of size sufficient to cover the back plane of the LCD, the interior side of said lid forming a reflective surface and a diffuser of artificial light; and means for engaging the lid to the LCD so as to:
   (1) backlight the LCD with diffused artificial light when the lid is in a contact covering position to the back plane of the LCD,
   (2) spatially position the reflective surface of the lid in one intersecting locus of a plurality of intersecting loci to form a dihedral angle with the back plane of the LCD,
   (3) reflectively project incident ambient light through the back plane of the LCD,
   (4) spatially position at least a portion of the lid to extend beyond the LCD, said lid casting a shadow in ambient light over the LCD viewing plane.

7. The arrangement according to claim 6, wherein the means for spatially positioning at least a portion of the lid to project over the LCD forms a dihedral angle of approximately 90 degrees providing an unobstructed path through the LCD for an independent source of focused light incident upon the back plane.

8. The arrangement according to claim 7, wherein the plane of the LCD is normal to the source of illumination and said lid when positioned at a 90-degree angle thereto and supports an air gap between the LCD and the illumination source.

9. A system for enhancing the observability of a multicolored liquid crystal display (LCD), said LCD being resident in a top lid in a computer of the notebook type, said LCD having a back plane and a viewing plane, said system comprising in combination:

(a) a mechanically-separable top lid of the notebook computer forming a diffuser/reflective surface and the LCD in a frame;

(b) a slider and linkage arrangement hingedly and rotatably attaching the diffuser/reflective surface to the LCD in the frame; and (c) means including the slider and linkage arrangement for positioning the diffuser/reflective surface in a plane, apart from, yet forming a dihedral angle with the plane of the LCD, said diffuser/reflector surface operating as a flat field illuminator, said means and arrangement providing a range of positions for the diffuser/reflector surface to opportunistically reflect ambient light through the back plane of the LCD and for causing at least a portion of the diffuser/reflective surface to project over the plane of the LCD, thereby securing a contrast-maintaining shadow otherwise bleachable by light incident to the LCD viewing plane.

* * * * *

UNITED STATES PATENT AND TRADEMARK OFFICE
CERTIFICATE OF CORRECTION

PATENT NO.   : 5,777,704
DATED        : July 7, 1998
INVENTOR(S)  : Edwin Joseph Selker et al.

It is certified that error appears in the above-identified patent and that said Letters Patent is hereby corrected as shown below:

<u>Title page,</u>
Item [75], insert after "Palo Alto, Calif." the following:
-- Jonathan Noble Betts-LaCroix of Chatsworth, Calif. --

Signed and Sealed this

Twenty-sixth Day of August, 2003

JAMES E. ROGAN
*Director of the United States Patent and Trademark Office*